(12) United States Patent
Bringe et al.

(10) Patent No.: US 8,940,353 B2
(45) Date of Patent: Jan. 27, 2015

(54) NON-DAIRY BEVERAGE COMPOSITION

(75) Inventors: Neal Allan Bringe, Elizabeth, CO (US); James Casey Waksmonski, Schofield, WI (US)

(73) Assignee: Whitewave Services, Inc., Broomfield, CO (US)

( * ) Notice: Subject to any disclaimer, the term of this patent is extended or adjusted under 35 U.S.C. 154(b) by 171 days.

(21) Appl. No.: 13/312,311

(22) Filed: Dec. 6, 2011

(65) Prior Publication Data
US 2013/0142933 A1 Jun. 6, 2013

(51) Int. Cl.
*A23L 2/38* (2006.01)

(52) U.S. Cl.
USPC ............. 426/590; 426/74; 426/520; 426/521; 426/630; 426/634

(58) Field of Classification Search
CPC .. A23C 11/103; A23L 3/3562; A23L 1/2275; A23V 2200/02
USPC .................... 426/634, 630, 590, 74, 520, 521
See application file for complete search history.

(56) References Cited

U.S. PATENT DOCUMENTS

| | | | |
|---|---|---|---|
| 5,753,295 A | 5/1998 | Goldman | |
| 2008/0206406 A1* | 8/2008 | De Jongh et al. | 426/74 |
| 2008/0241318 A1 | 10/2008 | Minus | |
| 2011/0070337 A1* | 3/2011 | Chiaverini | 426/74 |

FOREIGN PATENT DOCUMENTS

| | | |
|---|---|---|
| WO | WO 02/49459 | 6/2002 |
| WO | WO 2008/147226 | 12/2008 |

OTHER PUBLICATIONS

Product Manual "OxiSelect™ Advanced Glycation End Product (AGE) ELISA It," Catalog #STA-317, © 2009-2011: Cell Biolabs, Inc, 2009.
Giroux et al., "Use of Heated Milk Protein—Sugar Blends as Antioxidant in Dairy Beverages Enriched with Linseed Oil," LWT—Food Science and Technology 43 (2010) pp. 1373-1378, Elsevier Ltd, 2010.
Semba et al., "Does Accumulation of Advanced Glycation End Products Contribute to the Aging Phenotype?" Journal of Gerontology: Medical Sciences, pp. 963-975, Sep. 2010.
Totlani, V.M. and Peterson, D.G. Epicatechin carbonyl-trapping reactions in aqueous Maillard systems: Identification and structural elucidation. J. Agric. Food Chem. 2006. 54: 7311-7318, 2006.

(Continued)

*Primary Examiner* — Helen F Heggestad
(74) *Attorney, Agent, or Firm* — Baker Botts L.L.P.

(57) ABSTRACT

In one embodiment, a method comprises adding ingredients to a mixing chamber, the ingredients comprising: one or more non-dairy first ingredients; one or more second ingredients operable to facilitate Maillard browning reactions; and one or more third ingredients selected from the group consisting of stabilizers, vitamins, minerals, flavors, functional ingredients, salts, antioxidants, sugar, and water. The method also comprises mixing to yield a mixture having the ingredients dispersed substantially evenly throughout. The method further comprises processing the mixture to yield a non-dairy beverage.

15 Claims, 1 Drawing Sheet

(56) References Cited

OTHER PUBLICATIONS

Totlani et al., "Reactivity of Epicatechin in Aqueous Glycine and Glucose Mail lard Reaction Models: Quenching of C2, C3, and C4 Sugar Fragments," Department of Food Science, 215 Borland Laboratory, The Penn. State Univ., University Park, Pennsylvania 16802-2504, J. Agric. Food Chem., 2005, 53 (10), pp. 4130-4135, 2005.

H. Nursten, "Maillard Reaction," Univ. of Reading, Reading, UK, © 2011 Elsevier Ltd. (pp. 217-235), 2011.

Li Ey, "The Degradation of L-threose at Maillard Reattion Conditions," Department of Biochemistry, Univ. of Missouri, Columbia 65211, Carbohydr Res. Mar. 18, 1994; 256(1) 41-7, Mar. 1994.

Wang et al., "Melanoidins Produced by the Maillard Reaction: Structure and Biological Activity," Food Chemistry 128 (2011) 573-584, © Elsevier Ltd, 2011.

Phillips et al., Total Antioxidant. Content of Alternatives to Refined Sugar, Journal of the American Dietetic Association, © 2009, pp. 64-71, 2009.

Brewer, M.S., "Natural Antioxidants: Sources, Compounds, Mechanisms of Action, and Potential Applications," © 2011 Institute of Food Technologies, vol. 10, pp. 221-247, 2011.

European Patent Office Communication and Search Report for Reference No. JL65686P.EPP, 6 pp, Feb. 13, 2013.

\* cited by examiner

NON-DAIRY BEVERAGE COMPOSITION

TECHNICAL FIELD OF THE DISCLOSURE

This invention relates in general to an improved non-dairy beverage composition and, more particularly, to a non-dairy beverage with lower oxidation and improved taste characteristics.

BACKGROUND

Non-dairy beverages, such as soymilk or almond milk, may have a beany and/or grassy taste that may be unfavorable to consumers. This taste may be the result of lipid oxidation during processing, packaging, and/or storage. One indicator of lipid oxidation may include hexanal levels in the non-dairy beverage composition. Past methods of reducing hexanal levels have centered on the use of Ultra High Temperature (UHT) pasteurization for a few seconds followed by vacuum cooling, the inclusion of antioxidants, and the use of different soybeans in soy beverages. These methods, however, have produced limited results in lowering hexanal levels in non-dairy beverages.

SUMMARY

In one embodiment, a method comprises adding ingredients to a mixing chamber, the ingredients comprising: one or more non-dairy first ingredients; one or more second ingredients operable to facilitate Maillard browning reactions; and one or more third ingredients selected from the group consisting of stabilizers, vitamins, minerals, flavors, functional ingredients, salts, antioxidants, sugar, and water. The method also comprises mixing to yield a mixture having the ingredients dispersed substantially evenly throughout. The method further comprises processing the mixture to yield a non-dairy beverage.

Certain embodiments of the present disclosure may provide one or more technical advantages. As an example, in some embodiments, the taste characteristics of a non-dairy beverage may be enhanced through the use of ingredients containing reducing sugars. As another example, in some embodiments, the taste characteristics may be enhanced by the use of calcium carbonate. As yet another example, in some embodiments, a product with enhanced taste characteristics may be obtained while reducing the level of Advanced Glycation End-products (AGE), which may have pro-oxidant and/or pro-inflammatory properties in humans.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
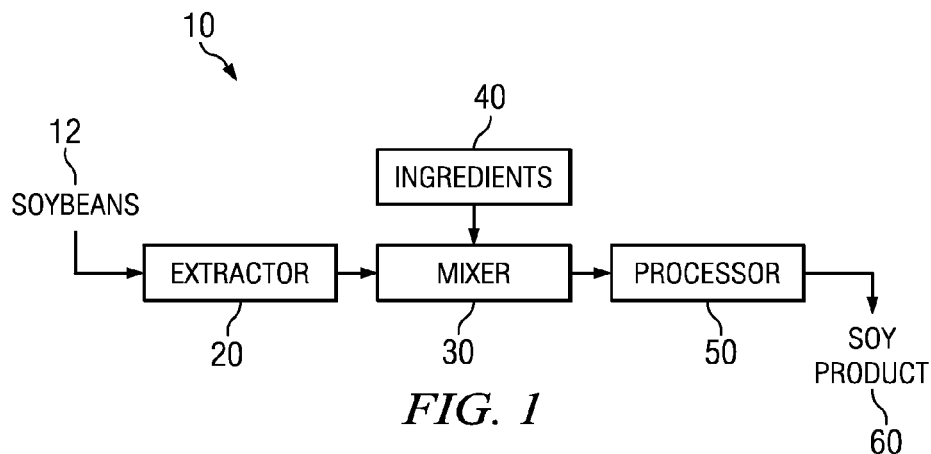
FIG. 1 illustrates an example of a system 10 for processing soybeans to yield a soy product with lower hexanal levels.
Figure 2:
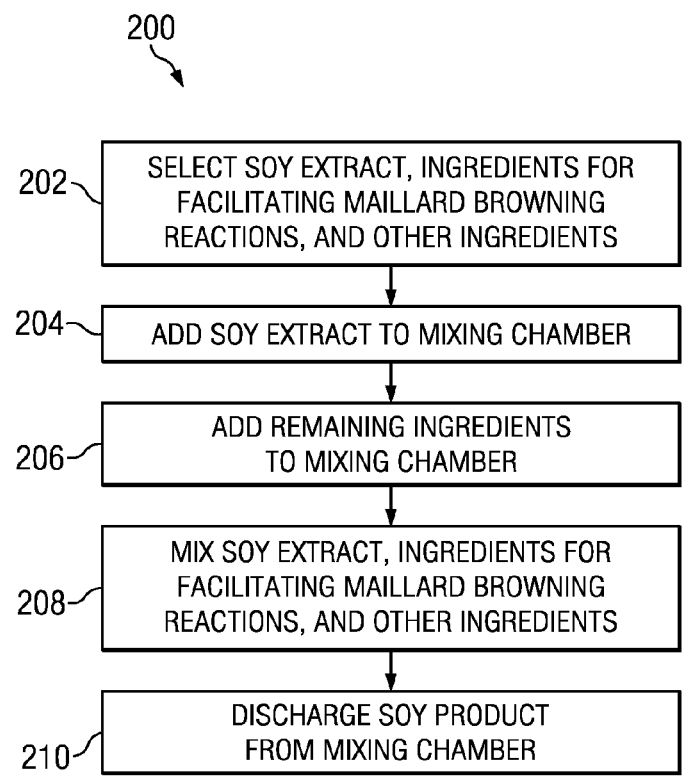
FIG. 2 illustrates an example of a method for producing a soy product with lower hexanal levels.

Embodiments of the present invention and its advantages are best understood by referring to FIGS. 1 to 2 of the drawings, like numerals being used for like and corresponding parts of the various drawings.

Non-dairy beverages, such as soymilk or almond milk, may have a beany and/or grassy taste that may be unfavorable to consumers. This taste may be the result of lipid oxidation during processing, packaging, and/or storage. One indicator of lipid oxidation may include hexanal levels in the non-dairy beverage composition. Past methods of reducing hexanal levels have centered on the use of Ultra High Temperature (UHT) pasteurization for a few seconds followed by vacuum cooling or flash cooling, the inclusion of antioxidants, and the use of different soybeans in soy beverages. These methods, however, have produced limited results in lowering hexanal levels in non-dairy beverages.

Therefore, one aspect of the present disclosure relates to decreasing lipid oxidation, and thus hexanal levels, in non-dairy beverages through the selection of one or more ingredients that facilitate Maillard browning reactions. Such ingredients may serve to further decrease oxidation and hexanal levels in the non-dairy beverage mixture. The Maillard browning reaction may refer to certain chemical reactions, such as a chemical reaction between an amino acid and a reducing sugar wherein the reactive carbonyl group of the sugar reacts with the nucleophilic amino group of the amino acid. In such reactions, Maillard browning polymers may replace hexanal at protein binding sites in a non-dairy mixture, which may in turn allow for hexanal to be released during vacuum cooling or other processing steps. Maillard browning polymers (melanoidins) may also act as antioxidants. Therefore, the addition of ingredients comprising amino acids and/or reducing sugars may serve to facilitate Maillard browning reactions in non-dairy beverages, which may in turn lead to lower oxidation and hexanal levels in the beverages. Accordingly, in some embodiments, ingredients such as ascorbic acid (or derivatives thereof), glucose, ribose, fructose, honey, date syrup, high fructose corn syrup, malted barley, agave syrup, tapioca syrup, maple syrup, and/or brown rice syrup may be selected for inclusion in a non-dairy beverage in order to facilitate Maillard browning reactions in the mixture.

In addition, Maillard browning reactions may be facilitated by increasing pH levels and/or holding the non-dairy beverage at a relatively high temperature for a suitable holding period. As an example, certain ingredients such as calcium carbonate may be selected to increase the pH level to 7.5 to 9.5. As another example, a non-dairy beverage mixture may be held at a high temperature for a predetermined amount of time after mixing and prior to pasteurization. In some embodiments, pasteurization may include UHT pasteurization, wherein the mixture is heated to a temperature between approximately 280° F. to 306° F. for approximately 1 to 10 seconds. In certain embodiments, the mixture may be held at a temperature in the range of 175° F. to 195° F. for a period of 1 to 20 seconds prior to pasteurization. In certain embodiments, the mixture may undergo vacuum cooling to remove volatiles following pasteurization. In some embodiments, the vacuum cooling may be performed at a temperature of approximately 176° F. to 190° F. for a period of 1 to 5 seconds.

Accordingly, embodiments of the present disclosure may yield a non-dairy beverage with lower lipid oxidation and therefore enhanced taste characteristics. In some embodiments, the unfavored beany and/or grassy taste caused by lipid oxidation in the non-dairy beverage may be reduced. In some embodiments, a more favored taste may be introduced in the non-dairy beverage due to the lower oxidation and hexanal levels, such as the addition of a cereal taste which may result from Maillard browning products. In addition, in some embodiments, certain polyunsaturated fatty acids (which are more prone to oxidation than other lipids) may be included in the non-dairy beverage without substantial deterioration in the taste characteristics of the beverage caused by lipid oxidation. For example, flax seed oil, whole ground flax seed, or ground chia seed may be included in embodiments of the present disclosure without negative effects on the taste characteristics. Typically, such additives may not be used in non-dairy beverages due to their higher oxidation potential. Moreover, certain embodiments of the present disclosure may yield a non-dairy beverage with substantially longer shelf life. For example, particular embodiments may have a shelf life of approximately 24 weeks as measured by hexanal levels in the beverage, as compared with 12 weeks for a typical non-dairy beverage.

FIG. 1 illustrates an example of a system 10 for processing soybeans 12 to yield a soy product 60 with lower hexanal levels. In some embodiments, system 10 may include an extractor 20, a mixer 30, ingredients 40, and a processor 50.

In some embodiments, extractor 20 may generate an aqueous soy extract from soybeans. For example, extractor 20 may receive dried soybeans 12 and may remove the hulls. The de-hulled soybeans 12 may be ground with water, and the soluble components of the soybeans 12 may be extracted into the water to form a soy extract (e.g., full fat soy extract or low fat soy extract). The insoluble components may be separated out of the soy extract, for example, by mechanical means. The soy extract may then be added to mixer 30.

In some embodiments, mixer 30 may combine the soy extract with other ingredients 40 to produce a product 60. Mixer 30 may comprise any appropriate container suitable to receive, mix, and/or discharge one or more ingredients 40. In particular embodiments, mixer 30 may comprise a stainless steel chamber of any suitable size. For example, mixer 30 may be sized to mix the soy extract and ingredients 40 in large batches that may later be divided into smaller sizes suitable for sales to consumers, or mixer 30 may be sized to mix smaller, individual-sized portions.

Mixer 30 may receive the soy extract and the ingredients 40 through one or more different inlets. For example, the soy extract may be added to the mixing chamber through one or more nozzle and hose inlets, and other ingredients 40, such as sweeteners, flavors, and/or stabilizers, may be added through one or more openings in mixer 30. Mixer 30 may include one or more means for blending, mixing, combining, stirring, and/or agitating ingredients 40. For example, mixer 30 may include mechanical agitators, pressure jets, or other suitable mixing devices, whether located within mixer 30 or external to mixer 30. Alternatively, mixer 30 may allow for stirring or mixing by hand. In some embodiments, mixer 30 may be chilled (depending on the particular ingredients 40 used) to prevent spoliation of one or more ingredients 40 during mixing and/or processing. Accordingly, mixer 30 may include a jacketed or insulated tank to maintain appropriate temperatures. Mixer 30 may also include one or more discharge outlets connected to other components of system 10. For example, mixer 30 may include one or more discharge outlets connected to hoses or tubes, which may carry an aqueous solution mixed by mixer 30 to processor 50, which may comprise one or more processing components.

Ingredients 40 represent constituent elements of product 60 that are deposited, mixed or combined, and discharged from mixer 30. Examples of ingredients 40 may include, but are not limited to, sweeteners, stabilizers, vitamins, minerals, flavors, extracts, salts, coloring agents, functional ingredients, and other ingredients including vegetables, ground seeds, grain flours, dairy milk or dairy milk alternatives. Sweeteners may be added to enhance the taste of the flavorings provided and/or provide overall sweetness to product 60. In particular embodiments, sweeteners may include one or more natural, high-intensity sweeteners, such as stevia, including any compound or extract derived from the stevia plant (e.g., rebiana-A, rebaudioside-A, and reb-A). In some embodiments the natural, high-intensity sweetener may be co-processed with other sweeteners. As an example, stevia may be co-processed with sugar by blending, co-crystallization, plating (e.g., applying a solution of stevia and water to sugar crystals and allowing the stevia to dry on the surface of the sugar crystals), or other co-processing. Stabilizers may be added to mixer 30 to prevent separation or precipitation of product 60 once deposited in a package or container. Vitamins and minerals may be added to enhance the nutritional profile of product 60. Flavors may be added to enhance and/or change the taste of the resulting mixture. For example, flavors may include vanilla extract, almond extract, citrus extract, cocoa powder, strawberry or other fruit flavoring, or any other appropriate extracts, chemical compounds, or natural additives suitable to provide the described function. Salts may be added to improve taste and/or to act as buffering agents to enhance protein stability. One or more polyunsaturated fatty acids may be added to improve the nutritional profile of the soy beverage.

Ingredients 40 may also include one or more ingredients operable to facilitate Maillard browning reactions in the mixture. In some embodiments, ingredients comprising reducing sugars and/or ingredients that form reducing sugars under heat treatment may be added to participate in Maillard browning reactions. Examples of ingredients comprising reducing sugars include glucose, ribose, fructose, honey, date syrup, high fructose corn syrup, malted barley, agave syrup, brown rice syrup, tapioca syrup, maple syrup, or any other suitable ingredient comprising reducing sugars may be selected for inclusion in the mixture, as they may provide higher levels of reducing sugars. In certain embodiments, the preceding ingredients may provide higher levels of reducing sugars for participating in Maillard browning reactions than cane sugar or other sweeteners. Examples of ingredients that may form reducing sugars under heat treatment include ascorbic acid or derivatives thereof (e.g. sodium ascorbate, calcium ascorbate, or potassium ascorbate). In certain embodiments, calcium carbonate and/or any other suitable ingredients may be selected to facilitate Maillard browning reactions by increasing the pH of the mixture during mixing and/or processing.

In operation, an operator of system 10 selects appropriate ingredients for the desired finished product. Once appropriate ingredients 40 are selected, an operator introduces selected ingredients 40 into mixer 30. Ingredients may be added serially (i.e., one at time), collectively (i.e., all ingredients are added substantially at once), or in a combination (i.e., certain subsets of ingredients are pre-combined, and the combination is added serially with other ingredients or ingredient combinations). After an appropriate mixing time, the product 60 may be discharged into processor 50 manually or through one or more nozzles, hoses, spigots, or other appropriate discharging outlet.

Processor 50 may comprise one or more components for further processing the soy mixture. As an example, in some embodiments, processor 50 may include means for pasteurizing the soy mixture to reduce the number of undesirable microorganisms and prolong shelf life. Pasteurization may refer to heating the product to a temperature (e.g., 160 to 295° F.) and holding it at the temperature for a period of time (e.g., 1 to 30 seconds) to reduce the number of viable pathogenic micro-organisms in the product. Examples of pasteurization techniques include high temperature short time pasteurization (HTST), ultra pasteurization (UP), ultra high temperature pasteurization (UHT), and high pressure pasteurization (HPP). In some embodiments, the soy mixture may be processed through a heat exchanger to pasteurize the mixture and then processed through another heat exchanger to cool the mixture. In certain embodiments, pasteurizing the mixture may include UHT pasteurization wherein the mixture is heated to a temperature between approximately 280° F. to 306° F. for a period of 1 to 10 seconds. In certain embodiments, processor 50 may include means for holding the soy mixture at a temperature that ranges from 175° F. to 195° F. for a period of 1 seconds to 20 seconds prior to pasteurizing. As another example, processor 50 may include a homogenizer or other means for reducing particle size so that particle distribution may be maintained and mouthfeel may be improved. In certain embodiments, the mixture may be processed through a homogenizer after pasteurization. In particular embodiments, the mixture may undergo vacuum cooling to remove volatiles following pasteurization. In some embodiments, the vacuum cooling may be performed at a temperature of approximately 176° F. to 190° F. for a period of 1 to 5 seconds.

In particular embodiments, product 60 comprises a flavored or non-flavored soymilk beverage. In general, however, product 60 may represent any soybean based food product. Additionally, although the example has described configuring system 10 to produce a soy product, system 10 may be alternatively configured to produce other non-dairy (e.g., nut, coconut, vegetable, seed, or cereal-based milk) products, dairy products, or combinations of one or more non-dairy and/or dairy products containing greater than approximately 2 grams of protein per serving.

In some embodiments, the product 60 may be directed from processor 50 to packaging, bottling, or filling components suitable to ready product 60 for commercial sale or use. For example, packaging components may deposit an amount of the mixture into one or more bottles, jars, cans, cartons, and/or any other appropriate container.

Modifications, additions, or omissions may be made to system 10 without departing from the scope of the invention. The components of system 10 may be integrated or separated. Moreover, the operations of system 10 may be performed by more, fewer, or other components.

FIG. 2 is a flow diagram illustrating a method 200 for producing a soy product with lower hexanal levels. The method begins at step 202 where appropriate ingredients are selected. In some embodiments, the ingredients may include a non-dairy milk base, such as soy extract, one or more ingredients operable to facilitate Maillard browning reactions, and one or more other ingredients including sweeteners, stabilizers, vitamins, minerals, flavors, functional ingredients, salts, other dairy or non-dairy milk, antioxidants, and water.

The quantity of soy extract may be selected to provide a desired nutritional profile based on the nutrient composition of the extract, for example 10 to 80% of the formula.

In some embodiments, ingredients comprising reducing sugars and/or ingredients that form reducing sugars under heat treatment may be added to participate in Maillard browning reactions. Examples of ingredients comprising reducing sugars include glucose, ribose, fructose, honey, date syrup, high fructose corn syrup, malted barley, agave syrup, brown rice syrup, tapioca syrup, maple syrup, or any other suitable ingredient comprising reducing sugars may be selected for inclusion in the mixture, as they may provide higher levels of reducing sugars. In certain embodiments, the preceding ingredients may provide higher levels of reducing sugars for participating in Maillard browning reactions than cane sugar or other sweeteners. Examples of ingredients that may form reducing sugars under heat treatment include ascorbic acid or derivatives thereof (e.g. sodium ascorbate, calcium ascorbate, or potassium ascorbate). Other suitable sources for reducing sugars for participation in Maillard browning reactions may include those ingredients containing a carbonyl group in its chemical structure. In certain embodiments, calcium carbonate and/or any other suitable ingredients may be selected to facilitate Maillard browning reactions by increasing the pH of the mixture during mixing and/or processing.

Sweeteners may be natural, artificial, and/or high-intensity and may function to make the products taste more appealing. Depending on their sweetening power, sweeteners may comprise approximately 0.1% to 20% of the formula. Natural, high-intensity sweeteners, such as stevia or stevia derivatives, may be used as a low-calorie alternative to or in combination with other sweeteners, such as other natural, high-intensity sweeteners, sugar (e.g., liquid sugar, crystallized sugar, honey, agave, cane juice, etc.), and/or artificial sweeteners (e.g., sucralose, aspartame, saccharine, etc.). In some embodiments, an amount of sugar to be combined with the natural, high-intensity sweetener may be selected to yield a selected sweetness level and selected number of calories, while minimizing metallic or bitter flavors that may be associated with the natural, high-intensity sweetener alone.

Stabilizers enhance physical properties of beverages by imparting viscosity or mouthfeel properties that may increase consumer appeal. Stabilizers may be natural or artificial and may contribute to a uniform appearance of products by stabilizing and or suspending insoluble materials and preventing separation or settling of ingredients. Examples of stabilizers may include, but are not limited to, emulsifiers, starches, gums, and various hydrocolloids such as guar, acacia, locust bean, xanthan, gellan, carrageenan, cellulose, and pectin. Approximate ranges of stabilizers may vary from 0.02 to 5% depending on desired product properties and functionality of stabilizers.

Vitamins and minerals may be added to fortify products. As an example, in some embodiments, the product may be fortified with calcium using calcium sources such as carbonate ($CaCO_3$) and/or tricalcium phosphate ($Ca_3(PO_4)_2$). The calcium source may be selected to maintain a pH level within a suitable range during processing, such as pasteurization processing. Pasteurization may refer to heating the product to a temperature (e.g., 280 to 306° F.) and holding it at the temperature for a period of time (e.g., 1 to 10 seconds) to reduce the number of viable pathogenic micro-organisms in the product. The product may be pasteurized and cooled using indirect or direct heating. An example of indirect heating may include passing the product through a heated pipe. An example of direct heating may include injecting steam into the product. A vacuum flash may be applied to the steam-injected product once the pasteurization process has been completed to remove the water vapor and/or some volatile odors, and to cool the product.

Flavors and flavoring ingredients including extracts of plant materials, cocoa powder, milk based ingredients, compounded flavors, impart desired taste attributes to products. They are used at various levels depending on the strength and the desired end product attributes. Approximate ranges of flavoring ingredients may vary from 0.002 to 5% depending on desired product properties.

Functional ingredients like fiber, plant sterols, etc. may be added to soymilk formulations to enhance functionality of products.

Salts of various types may also be used to improve taste, and to act as buffering agents to enhance protein stability. Such salts include sodium citrate, sodium chloride, potassium citrate, potassium phosphate, and dipotassium phosphate.

Antioxidants may prevent and/or reduce oxidation and may preserve the flavor and appearance of the product during refrigerated and/or unrefrigerated storage. Antioxidants may reduce oxidation by trapping free radicals in the product. Certain antioxidants, such as rosemary and spearmint, may inhibit or have little to no effect on Maillard browning reactions. Other antioxidants, such as ascorbic acid and derivatives thereof (which can oxidize to form a reducing sugar threose), may facilitate Maillard browning reactions in addition to trapping free radicals. Thus, ascorbic acid may reduce oxidation in soymilk more than rosemary, spearmint, or other antioxidants that do not participate in Maillard browning reactions. Other examples of antioxidants may include Maillard browning products (melanoidins), BHA, BHT, propyl gallate, and tocopherols.

Polyunsaturated fatty acids (PUFAs) refer to a family of fatty acids that naturally occur in certain fish, leafy green vegetables, and vegetable oils. Polyunsaturated fatty acids can include a carbon chain comprising eighteen or more carbon atoms and two or more double bonds. Examples of polyunsaturated fatty acids include omega fatty acids, such as omega-3 fatty acids (e.g., docosahexaenoic acid (DHA), docosapentaenoic acid (n-3) (DPAn-3), stearidonic acid (SDA), linolenic acid (LNA), and alpha linoleic acid (ALA), and eicosapentaenoic acid (EPA)), and omega-6 fatty acids (e.g., arachidonic acid (ARA), docosapentaenoic acid (n-6) (DPAn-6), linoleic acid (LA), gamma linolenic acid (GLA), and dihomo gamma linolenic acid (n-6)). Examples of ingredients containing PUFAs include flax seed and derivatives thereof (e.g. flax seed oil, whole ground flax seed) and genetically modified soybeans or canola.

In some embodiments, soymilk may be combined with other milks or milk substitutes. For example, soymilk may be combined with dairy milk, seed milk (e.g., flax seed milk), or nut milk (e.g., almond milk), or milks derived from cereals (e.g., rice milk). Water comprises the balance of the formula.

Although ingredients of the base system in the preceding examples have been used to illustrate certain properties, certain ingredients may be characterized by more than one property. As an example, ascorbic acid and derivatives thereof may be an ingredient selected to facilitate Maillard browning reactions, and may also serve as an antioxidant. As another example, agave syrup and/or brown rice syrup may be selected to facilitate Maillard browning reactions, but may also serve as sweeteners as well. As yet another example, calcium carbonate may be selected to facilitate Maillard browning reactions, and may also fortify the product with calcium.

The following illustrate examples of a soymilk formula with lower hexanal levels. Dry ingredients may be weighed according to the formula and blended together.

Example 1

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Tricalcium phosphate | 0-1% | 0.1-0.5% |
| Evaporated cane juice | 0-12% | 0.1-6% |
| Carrageenan | 0-0.1% | 0.04-0.08% |
| Sodium chloride | 0-0.2% | 0.05-0.1% |
| Tripotassium citrate | 0-0.50% | 0.02-0.2% |
| Natural flavor | 0-0.50% | 0.01-0.1% |
| Water | q.s. 100% | Balance |

Example 2

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Calcium carbonate | 0-1% | 0.1-0.6% |
| Evaporated cane juice | 0-12% | 0.1-6% |
| Carrageenan | 0-0.1% | 0.04-0.08% |
| Guar gum | 0-0.50% | 0.01-0.25% |
| Xanthan gum | 0-0.1% | 0.01-0.05% |
| Sodium chloride | 0-0.2% | 0.05-0.1% |
| Tripotassium citrate | 0-0.50% | 0.02-0.2% |
| Natural flavor | 0-0.50% | 0.01-0.2% |
| Water | q.s. 100% | Balance |

Example 3

| Ingredient | Approximate Range | Example Range |
| --- | --- | --- |
| Soybean extract comprising approximately 8-28% soy solids | 10-80% | 30-70% |
| Sodium ascorbate | 0-1% | 0.005-0.05% |
| Calcium carbonate | 0-1% | 0.1-0.6% |
| Agave and/or brown rice syrup | 0-12% | 0.1-6% |
| Cocoa powder | 0-2% | 0.5-1.5% |
| Rebaudioside A (high intensity sweetener) | 0-0.05% | 0.001-0.006% |
| Carrageenan | 0-0.1% | 0.04-0.08% |
| Guar gum | 0-0.50% | 0.01-0.25% |
| Xanthan gum | 0-0.1% | 0.01-0.05% |
| Sodium chloride | 0-0.2% | 0.05-0.1% |
| Tripotassium citrate | 0-0.50% | 0.02-0.2% |
| Natural flavor | 0-0.50% | 0.01-0.2% |
| Water | q.s. 100% | Balance |

In some embodiments, the soybean extract may comprise a low fat soybean extract to reduce fat levels and calories relative to regular soymilk and other types of milk. Low fat soybean extract may be produced from soybeans that have been partially defatted using an expeller process, an extrusion process, or other suitable process. In some embodiments, the low fat soybean extract may be produced from a regular soybean extract (i.e., an extract produced from whole soybeans) by removing fat from the extract using conventional or non-conventional means, such as centrifugation, membrane separation, and so on.

Example 4

| Ingredient | Approximate Range | Example Range |
|---|---|---|
| Low fat soybean extract with approximately 5-20% soy solids | 10-80% | 30-70% |
| Sodium ascorbate | 0-1% | 0.005-0.05% |
| Calcium carbonate | 0-1% | 0.1-0.6% |
| Agave and/or brown rice syrup | 0-12% | 0.1-6% |
| Cocoa powder | 0-2% | 0.5-1.5% |
| Rebaudioside A (high intensity sweetener) | 0-0.05% | 0.001-0.006% |
| Carrageenan | 0-0.1% | 0.04-0.08% |
| Guar gum | 0-0.50% | 0.01-0.25% |
| Xanthan gum | 0-0.1% | 0.01-0.05% |
| Sodium chloride | 0-0.2% | 0.05-0.1% |
| Tripotassium citrate | 0-0.50% | 0.02-0.2% |
| Natural flavor | 0-0.50% | 0.01-0.2% |
| Water | q.s. 100% | Balance |

Certain ingredients may be increased or decreased to yield the desired properties. Additionally, levels of soy solids may be varied using any suitable soy source, such as soy extract, soy concentrate, and/or soy isolate.

At step 204, the soy extract, including water, may be introduced into the mixing chamber. The other ingredients, including those selected for facilitating Maillard browning reactions, may be added to the mixing chamber at step 206. As noted above, ingredients 40 may be added serially, collectively, or a combination.

At step 208, the soy extract and other ingredients may be mixed or combined in any appropriate manner to facilitate the dissolution of the dry ingredients in the mixture. For example, mechanical agitators, pressure jets, or other suitable mixing devices may be used to stir, mix, blend, agitate, or otherwise combine the ingredients. As another example, the ingredients may be stirred or mixed by hand. Mixing may continue until the ingredients are distributed substantially evenly throughout the product.

At step 210, the mixed soy product may be discharged from the mixing chamber. The product may then be directed to processing components, such as a pasteurizer and/or a homogenizer. In some embodiments, the product may be held at a temperature that ranges from 175° F. to 195° F. for a period of 1 to 20 seconds prior to pasteurization and/or homogenization. In certain embodiments, pasteurizing the mixture may include UHT pasteurization, which includes heating the mixture to a temperature between approximately 280° F. to 306° F. for a period of 1 to 10 seconds. In further embodiments, the mixture may undergo vacuum cooling to remove volatiles following pasteurization. In some embodiments, the vacuum cooling may be performed at a temperature of approximately 176° F. to 190° F. for a period of 1 to 5 seconds. The finished product may then be packaged and stored in refrigerated storage. In some embodiments, the flavor and texture of the finished product may be substantially maintained after storing for several days, such as at least five days.

The steps illustrated in FIG. 2 may be combined, modified, or deleted where appropriate, and additional steps may also be added to those shown. Additionally, the steps may be performed in any suitable order without departing from the scope of the present disclosure.

Although FIG. 1 and FIG. 2 show example embodiments of the present disclosure for producing a soy beverage, one of skill in the art will recognize that the concepts contained therein may be used to produce any suitable non-dairy beverage. For example, such concepts may be used to produce almond milk with enhanced taste characteristics. In some embodiments, the almond milk may contain a protein additive, such as pea protein, rice protein, or soy protein. Such protein additive may further facilitate Maillard browning reactions in the almond milk, which may serve to lower oxidation and hexanal levels. The following illustrates an example of an almond milk formula with lower hexanal levels.

Example 5

| Ingredient | Approximate Range | Example Range |
|---|---|---|
| Almond butter | 0.1-10% | 1-5% |
| Pea protein | 0-10% | 1-5% |
| Sodium ascorbate | 0-1% | 0.005-0.05% |
| Calcium Carbonate | 0-1% | 0.1-0.6% |
| Agave and/or brown rice syrup | 0-12% | 0.1-8% |
| Vanilla | 0-2% | 0.5-1.5% |
| Lecithin | 0-2% | 0.001-1% |
| Riboflavin | 0-1% | 0.00001-0.01% |
| Vitamin A | 0-1% | 0.00001-0.01% |
| Vitamin B12 | 0-1% | 0.00001-0.01% |
| Vitamin D2 | 0-1% | 0.00001-0.01% |
| Sodium Choride | 0-0.5% | 0.05-0.2% |
| Zinc Gluconate | 0-0.50% | 0.001-0.1% |
| Gellan gum | 0-0.50% | 0.01-0.1% |
| Locust bean gum | 0-1% | 0.01-0.1% |
| Water | q.s. 100% | Balance |

Furthermore, the concepts in the present disclosure may use to produce other types of milk, such as seed milk (e.g., flax seed milk) or milks derived from cereals (e.g., rice milk). Such milks may also contain a protein additive for further facilitation of Maillard browning reactions.

Certain embodiments of the present disclosure may provide one or more advantages. For example, the system and/or method may reduce oxidation in a non-dairy beverage. In particular embodiments, the system and/or method may provide a non-dairy beverage with lower lipid oxidation and hexanal levels as a result. As a result, the non-dairy beverage may have enhanced taste characteristics. In general, consumers may prefer to have increased cereal taste and decreased beany or grassy taste. In certain embodiments, the beany or grassy taste that consumers do not prefer may be reduced over the shelf life of the non-dairy beverage. In addition, some embodiments will have an enhanced flavor such as the cereal flavor that consumers enjoy. The enhanced flavor characteristics may result from increased facilitation of Maillard browning reactions in the product. In some embodiments, reducing lipid oxidation and hexanal levels in the non-dairy beverage may yield a reduction in AGE pro-oxidant, pro-inflammatory levels. Furthermore, in some embodiments, the shelf life of a non-dairy beverage may be substantially increased. Particular embodiments may provide some, none, or all of these operational benefits, and may provide additional operational benefits.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
adding ingredients to a mixing chamber, the ingredients comprising:
one or more non-dairy first ingredients comprising a protein;
one or more second ingredients operable to facilitate Maillard browning reactions, comprising:
an ingredient that forms reducing sugars when heated to a temperature within the range of 175° F. to 195° F. for a period of 1 second to 20 seconds, the ingredient that forms a reducing sugar being selected from the group consisting of ascorbic acid, sodium ascorbate, calcium ascorbate, and potassium ascorbate; and
a pH increasing ingredient that, when processed, increases a pH of a mixture to within the range of 8.0 to 9.0; and
one or more third ingredients selected from the group consisting of stabilizers, vitamins, minerals, flavors, salts, antioxidants, sugar, and water;
mixing to yield a mixture having the ingredients dispersed substantially evenly throughout;
heating the mixture to a temperature within the range of 175° F. to 195° F. for a period of 1 second to 20 seconds; and
processing the mixture after heating the mixture to yield a non-dairy beverage, wherein processing the mixture includes pasteurizing the mixture.

2. The method of claim 1, wherein the one or more second ingredients further comprise an ingredient comprising reducing sugars, the ingredient selected from the group consisting of glucose, ribose, fructose, honey, date syrup, high fructose corn syrup, malted barley, agave syrup, tapioca syrup, maple syrup, and brown rice syrup.

3. The method of claim 1, wherein the pH increasing ingredient includes calcium carbonate.

4. The method of claim 1, wherein the one or more non-dairy first ingredients include soy extract.

5. The method of claim 1, wherein the one or more non-dairy first ingredients include almond butter and a protein additive without a soy additive.

6. The method of claim 1, wherein pasteurizing the mixture comprises heating the mixture to a temperature between approximately 280° F. to 306° F. for a period of 1 to 10 seconds.

7. The method of claim 6, wherein processing the mixture further comprises vacuum cooling following pasteurization, the vacuum cooling performed at a temperature of approximately 176° F. to 190° F. over a period of 1 to 5 seconds.

8. A beverage prepared by the method comprising:
mixing a plurality of ingredients to yield a mixture having the ingredients dispersed substantially evenly throughout, the plurality of ingredients comprising:
one or more non-dairy first ingredients comprising a protein;
one or more second ingredients operable to facilitate Maillard browning reactions, comprising:
an ingredient that forms reducing sugars when heated to a temperature within the range of 175° F. to 195° F. for a period of 1 second to 20 seconds, the ingredient that forms a reducing sugar being selected from the group consisting of ascorbic acid, sodium ascorbate, calcium ascorbate, and potassium ascorbate; and
a pH increasing ingredient that, when processed, increases a pH of a mixture to within the range of 8.0 to 9.0; and
one or more third ingredients selected from the group consisting of stabilizers, vitamins, minerals, flavors, salts, antioxidants, sugar, and water; and
heating the mixture to a temperature within the range of 175° F. to 195° F. for a period of 1 second to 20 seconds; and
processing the mixture after heating the mixture to yield a non-dairy beverage, wherein processing the mixture includes pasteurizing the mixture.

9. The beverage of claim 8, wherein the one or more second ingredients further comprise an ingredient comprising reducing sugars, the ingredient selected from the group consisting of glucose, ribose, fructose, honey, date syrup, high fructose corn syrup, malted barley, agave syrup, tapioca syrup, maple syrup, and brown rice syrup.

10. The beverage of claim 8, wherein the pH increasing ingredient includes calcium carbonate.

11. The beverage of claim 8, wherein the one or more second ingredients operable to facilitate Maillard browning reactions comprise approximately 0.01% to 6% of the beverage.

12. The beverage of claim 8, wherein the one or more non-dairy first ingredients include soy extract.

13. The beverage of claim 8, wherein the one or more non-dairy first ingredients include almond butter and a protein additive without a soy additive.

14. The beverage of claim 8, wherein the plurality of ingredients further comprises one or more polyunsaturated fatty acids.

15. The beverage of claim 14, wherein the one or more polyunsaturated fatty acids include flax seed oil, whole ground flax seed, ground chia seed, or modified soybeans.

* * * * *